United States Patent [19]

Nash

[11] Patent Number: 5,117,492
[45] Date of Patent: May 26, 1992

[54] MEMORY ADDRESSING SYSTEM USING FIRST AND SECOND ADDRESS SIGNALS AND MODIFYING SECOND ADDRESS RESPONSIVE PREDETERMINED VALUES OF FIRST ADDRESS SIGNAL

[75] Inventor: Alan J. Nash, Birmingham, England

[73] Assignee: Lucas Industries Public Limited Company, Birmingham, England

[21] Appl. No.: 420,321

[22] Filed: Oct. 12, 1989

[30] Foreign Application Priority Data

Nov. 3, 1988 [GB] United Kingdom ............ 8825764

[51] Int. Cl.⁵ .................... G06F 1/00; G06F 12/00
[52] U.S. Cl. .................. 395/400; 364/DIG. 1;
     364/244; 364/255.1; 364/255.3
[58] Field of Search ... 364/200 MS File, 900 MS File

[56] References Cited

U.S. PATENT DOCUMENTS

| | | | |
|---|---|---|---|
| 3,737,860 | 6/1973 | Sporer | 340/172.5 |
| 4,145,738 | 3/1979 | Inoue et al. | 364/200 |
| 4,290,106 | 9/1981 | Castiller et al. | 364/200 |
| 4,368,515 | 1/1983 | Nielsen | 364/200 |
| 4,443,847 | 4/1984 | Bradley et al. | 364/200 |
| 4,453,212 | 6/1984 | Gaither et al. | 364/200 |
| 4,485,457 | 11/1984 | Balaska et al. | 364/900 |
| 4,590,551 | 5/1986 | Matthews | 364/200 |
| 4,617,624 | 11/1986 | Goodman | 364/200 |
| 4,713,759 | 12/1987 | Yamagishi et al. | 364/200 |
| 4,819,152 | 4/1989 | Deerfield et al. | 364/200 |
| 4,882,672 | 11/1989 | Yahiro | 364/200 |
| 4,924,375 | 5/1990 | Fung et al. | 364/200 |
| 4,949,298 | 8/1990 | Nakanishi et al. | |

Primary Examiner—Thomas C. Lee
Assistant Examiner—L. Donaghue
Attorney, Agent, or Firm—Nixon & Vanderhye

[57] ABSTRACT

A computer has a pageable memory which comprises a plurality of memory units each made up of a plurality of blocks of addressable memory locations. A designated one of the blocks is required to be accessed in combination with the remainder of the blocks. Logic circuits are responsive to first and second groups of address bits to generate signals which enable a selected one of the memory units and access a selected one of the blocks on the selected unit. The designated block is accessed directly by one of the aforesaid groups of address bits.

4 Claims, 3 Drawing Sheets

| 30—32 | b15, b14 | b15n, b14 | A–L | P |
|---|---|---|---|---|
| 30 | 0 0 | 0 0 | A | / |
| | 0 1 | 0 1 | B | 0 |
| | 1 0 | 1 0 | C | |
| 31 | 0 1 | 1 1 | D | 1 |
| | 1 0 | 0 0 | E | |
| | 0 1 | 0 1 | F | 2 |
| | 1 0 | 1 0 | G | |
| 32 | 0 1 | 1 1 | H | 3 |
| | 1 0 | 0 0 | I | |
| | 0 1 | 0 1 | J | 4 |
| | 1 0 | 1 0 | K | |
| | 0 1 | 1 1 | L | 5 |

FIG.3.

MEMORY ADDRESSING SYSTEM USING FIRST AND SECOND ADDRESS SIGNALS AND MODIFYING SECOND ADDRESS RESPONSIVE PREDETERMINED VALUES OF FIRST ADDRESS SIGNAL

BACKGROUND OF THE INVENTION

1. Field of the Invention

This invention relates to a memory addressing system for a digital computer which has an associated external memory.

2. Discussion of Prior Art

The amount of memory addressable by a computer is normally limited by the length of the address words generated by that computer An n bit address word can address $2^n$ memory locations. It is known, for example from EP-A-0057815, to increase the size of the addressable memory by providing memory units which are organised as pages of up to $2^n$ addressable memory locations, each page comprising a set of one or more blocks of addressable locations, and generating both page selection codes and block selection codes which access one or more of those blocks. A specific address in the selected block is determined by a part of the aforesaid n bit address. Such a procedure is known as memory mapping.

A program may require that a block of memory locations, hereinafter referred to for convenience as the "universal" block, and which holds the program subroutines, should be accessible in combination with each of the other blocks. If such a universal block formed part of a page an appropriate page selection code would require to be generated for the aforesaid universal block, as well as for each other block with which it is to be used in combination, on each occasion. Such a procedure will be time-consuming.

Though the universal block could be accessed, without requiring generation of a page selection code, if that block were duplicated in every page of the memory, such a technique would be wasteful both of addressable space in the memory units and of time required to program each universal block individually.

Alternatively the aforesaid universal memory block may be located in a memory device which is separate from the devices on which the other memory blocks are located and which can be selected independently of the page selection code, whereby no page change operation is required to access the universal block in combination with any other block. This latter approach will require the provision of at least one additional memory device.

It is an object of the invention to provide a computer memory addressing system in which a universal memory block, as above defined, may be accessed without recourse to a page change operation and without the provision of a separate memory unit for that block or duplication of the universal memory block in every page.

According to the invention there is provided a computer memory addressing system comprising a central processor, an external memory consisting of a plurality of memory units each of which contains blocks of memory locations, means for supplying first address signals indicative of sets of selected ones of said blocks, means for supplying second address signals indicative of groups of selected ones of said blocks, and logic circuits responsive to said first and second address signals for generating enabling signals for selected ones of said memory units and for generating signals accessing a required block in an enabled one of said memory units, a block in one of said memory units being accessed by one of said second address signals only.

DETAILED DESCRIPTION OF PREFERRED EMBODIMENTS

Figure 1:
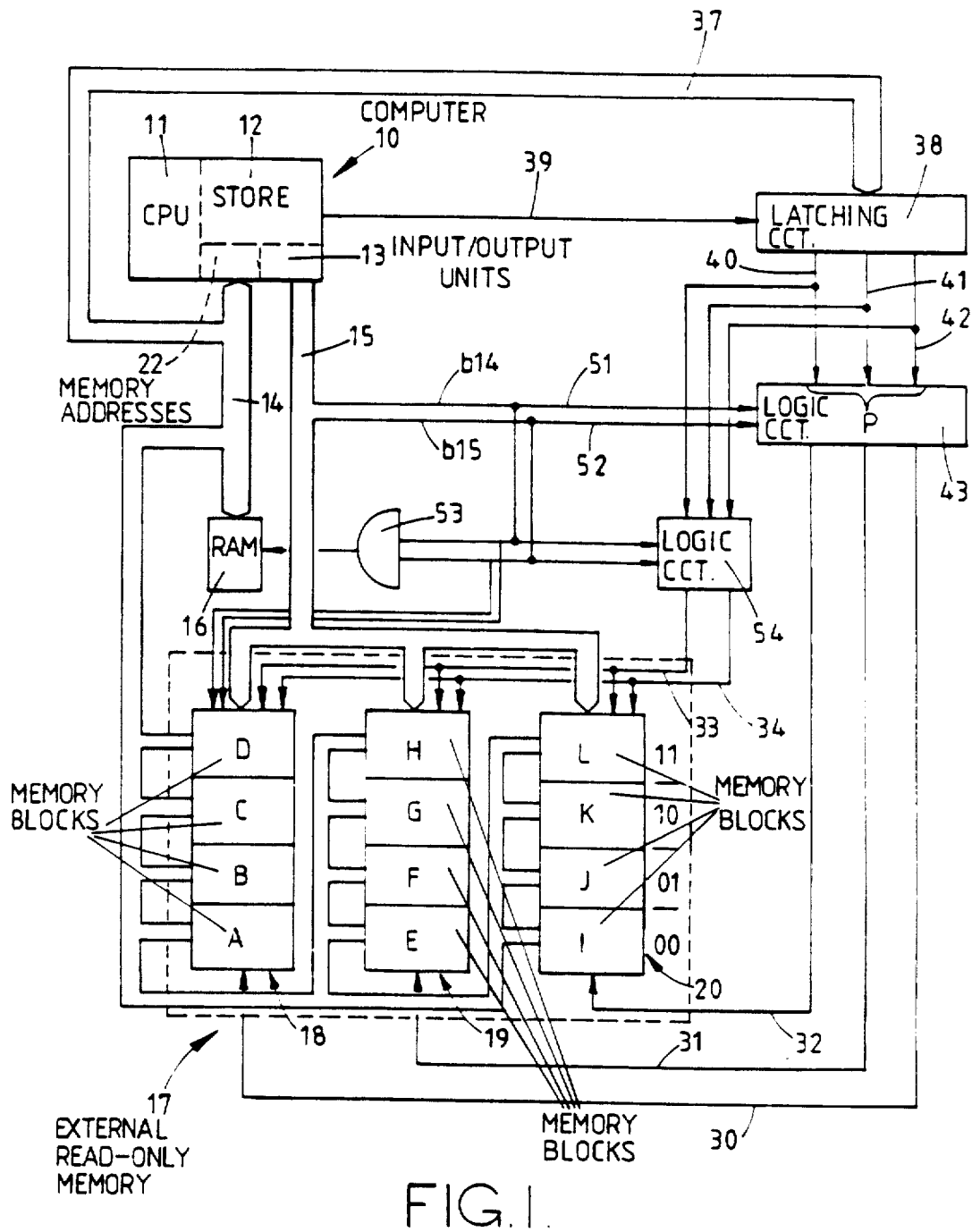
FIG. 1 is a block diagram of a computer, an external memory and means for addressing parts of the external memory.

The diagram of FIG. 1 is to be regarded as indicating the functions of the system, rather than as a depiction of an actual apparatus. As shown in FIG. 1 a digital computer 10 includes a central processor unit 11, store locations 12 and input-output units 13. A data bus 14 and an address bus 15 connect the units 13 to an external random access memory (RAM) 16 and to an external read only memory (ROM) 17. The ROM 17 stores machine code orders for controlling operation of an external apparatus in response to instructions in a high level program language. Where a machine code order includes an address, that address is used for accessing data in the ROM 17 or ROM 16.

The ROM 17 is carried on three memory units comprising integrated circuit chips 18, 19, 20, each of which is divided into four blocks of memory locations, these blocks being labelled A to L and each having a capacity of 16K bytes. The blocks A to L are selectively addressable, in a manner to be described, by means of logic circuits responsive to bits of the address Block A forms a ROM which contains subroutines, constants, tables etc, which are expected to be common to all programs contained in the blocks B to L and which will require to be accessed during execution of those programs. Blocks B to L contain one or more programs and information specific to those programs. The blocks are arranged in sets BC, DE, FG, HI, JK which form larger units of 32K bytes each, referred to as pages P0 to P4. The block L forms a half-page P5. FIG. 3 shows the relationship between the blocks B to L and the pages P0–P5. It will be noted that block A is not included in the page numbering sequence.

Figure 2:
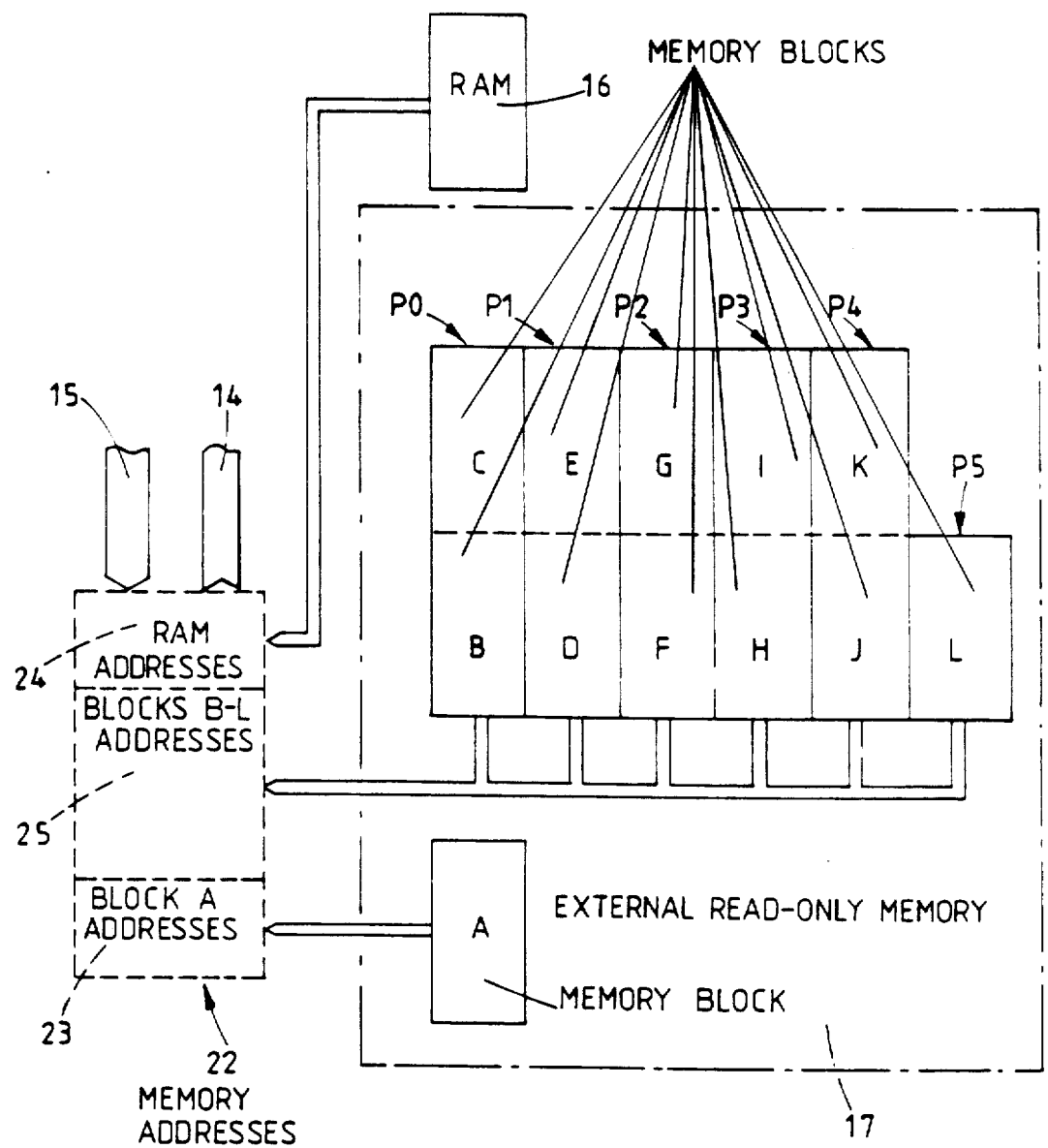
FIG. 2 is a diagram of the organization of the external memory and, FIG. 3 is a table showing operation of a part of the addressing system of FIG. 1.

The central processor 11 of the specific example can handle addresses having a maximum of 16 bits, and can therefore directly access no more than 64K memory locations A 64K range of memory locations directly addressable by the processor 11 is notionally indicated at 22 in FIGS. 1 and 2. FIG. 2 illustrates the way in which the range 22 of 64K locations is allocated to the various parts of the memories 16 and 17. A first 16K area 23 of addressable locations is allocated to locations in block A. A second 16K area 24 of addressable locations is allocated to locations in the RAM 16. The remaining 32K area 25 of locations is allocated to locations in blocks B–L. Such an association of external memory locations with corresponding groups of addresses is known as memory mapping. The method of construction by which the blocks A–L are accessed by way of the memory areas 23, 25 forms the basis of the present invention.

The system for accessing required ones of the blocks A-L by way of the appropriate addressable locations 23, 25 will now be described. A desired one of the blocks A to L is selected by means of an enabling signal on one of lines 30, 31, 32 for chips 18, 19, 20 respectively, in combination with block-selection bits on lines 33, 34. The block-selection bits on lines 33, 34 define, as indicated in FIG. 1 and at b15n, b14 in FIG. 3, groups of blocks A, E, I, or B, F, J, or C, G, K or D, H, L in the chips 18, 19, 20. The blocks A to L may be regarded as a matrix, so that combinations of an enabling signal and a block-selection signal define a unique one of the blocks.

A machine code address in the form of two words, is provided by the program in the ROM 17. The three least significant bits of the first word of the address define a page number, enabling designation of up to eight pages. The first address word is supplied on a bus 37 to a latching circuit 38 which stores the page-indicating bits in response to a clock pulse on a line 39. The three page-indicating bits are supplied on lines 40, 41, 42 to a logic circuit 43. The second address word comprises 16 bits, the two most significant bits b15, b14 being supplied on lines 51, 52 to the circuit 43 to generate, in cooperation with the page-indicating bits on lines 40, 41, 42, the chip-enabling signals on lines 30, 31, 32. FIG. 3 provides a truth table for circuit 43, showing the combination of page number P and bits b15, b14, which result in enabling signals on lines 30, 31, 32.

The four combinations of bits b15, b14 are used as follows:
00 accesses block A only
11 accesses the RAM 16 only
01 and 10 access the blocks B to L It will be seen from FIG. 3 that the circuit 43 does not respond to values 11 of bits b15, b14, these values being unique to RAM 16 and being applied thereto through an AND gate 53. Bits b15, b14 and the page-selection signals on lines 40, 41, 42 are also applied to a further logic circuit 54 which generates a new value b15n of bit b15. FIG. 3 shows a truth table in which combinations of page-selection signals P0 to P5 and values 01 and 10 of bits b15, b14 cooperate to provide a full range of four group-selection signals b15n, b14 on lines 33, 34. It will be seen that b15n differs from b15 only when the page number is odd and that this suffices to provide a full range of digital values on the lines 33, 34. The signals on lines 33, 34 are combined with the remaining 13 bits of the address data on the bus 15 to define an address location on a required block of the chip which has been enabled.

It will be noted that values 00 on lines 51, 52 are not associated with any page number P. Block A can thus always be accessed without any page change operation, even if data from a different chip has been accessed in an immediately preceding program step. This provision has the effect that the contents of block A may rapidly be accessed without having to provide a separate chip for the contents of block A, or providing an equivalent to block A on each chip.

I claim:

1. A computer memory addressing system, said addressing system comprising:
an external memory including a plurality of memory units, each of said memory unit containing a plurality of blocks of memory locations;
means for supplying first address signals indicative of sets of said blocks of memory locations which reside in one or more of said plurality of memory units;
means for supplying second address signals;
a first logic circuit means, responsive to said first address signals and said second address signals, for generating enabling signals for respective ones of said memory units; a second logic circuit means, responsive to predetermined values of said first address signal, for modifying one bit of at least one of said second address signals;
a second logic circuit means including means, responsive to a first address signals and either said second address signals, or said second address signal modified in response to predetermined vales of said first address signal, for generating access signals for respective ones of said blocks of memory locations in an enabled one of said memory units; and
one block of memory locations in one of said memory units, including means for permitting access by an unmodified one of said second address signals only.

2. A system as claimed in claim 1 wherein at least one memory unit includes means for permitting access by predetermined values of said second address signals only.

3. A method of addressing a computer memory, said memory comprises a plurality of memory units, each of said memory units includes a plurality of blocks of memory location, said method comprising:
supplying first address signals indicative of sets of said blocks of memory locations which reside in one or more of said plurality of memory units;
supplying second address signals;
generating enabling signals for respective ones of said memory units in response to said first and second address signals;
modifying said second address signals in response to predetermined values of said first address signal to provide signals for accessing respective ones of said blocks of memory location in an enabled one of said memory units, in response to said first and either second address signals or said modified second address signals, and
accessing one block in one of said memory units by an unmodified one of said second address signals only.

4. A computer memory addressing system, said addressing system comprising:
a central processor;
an external memory including a plurality of memory units, each memory unit containing blocks of memory locations;
means for supplying a first address signal indicative of sets of said blocks of memory locations which reside in one or more of said plurality of memory units;
means for supplying at least one second address signal, said at least one second address signal comprises two bits;
first and second logic circuits responsive to said first address signal and said at least one second address signal;
said first logic circuit means for generating enabling signals for respective ones of said plurality of memory units;
said second logic circuit including means for modifying one bit of said at least one second address signal in response to predetermined values of said first address signal;

said modified at least one second address signal comprising means for providing access signals for respective ones of said blocks in an enabled one of said plurality of memory units;

at least one of said memory units and one of said blocks being accessible by two respective unmodified values of said two bits of said at least one second address signal only.

* * * * *